(12) United States Patent
Cymbal et al.

(10) Patent No.: US 7,562,548 B1
(45) Date of Patent: Jul. 21, 2009

(54) STEERING COLUMN ASSEMBLY

(75) Inventors: William D. Cymbal, Freeland, MI (US); Richard K. Riefe, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 12/139,950

(22) Filed: Jun. 16, 2008

(51) Int. Cl.
*B60R 25/02* (2006.01)

(52) U.S. Cl. .............................. 70/186; 70/252; 70/422

(58) Field of Classification Search ............. 70/182–186, 70/248, 252, 422; 74/492, 493
See application file for complete search history.

(56) References Cited

U.S. PATENT DOCUMENTS

| | | | |
|---|---|---|---|
| 1,411,508 A | | 4/1922 | Persson |
| 3,103,985 A | | 9/1963 | Price, Jr. |
| 3,566,633 A | | 3/1971 | Borck |
| 3,566,634 A | | 3/1971 | Borck |
| 4,370,875 A | | 2/1983 | Piiroinen |
| 4,576,024 A | * | 3/1986 | Weber .......................... 70/252 |
| 4,750,380 A | * | 6/1988 | Hoblingre et al. ............. 74/556 |
| 4,773,240 A | * | 9/1988 | Foshee ......................... 70/222 |
| 4,854,141 A | * | 8/1989 | Haldric et al. ................. 70/182 |
| 4,903,511 A | * | 2/1990 | Niedzielski et al. ........... 70/252 |
| 4,991,458 A | * | 2/1991 | Stuedemann ................. 74/492 |
| 5,092,145 A | | 3/1992 | Haldric et al. |
| 5,121,616 A | * | 6/1992 | Rind ............................ 70/186 |
| 5,172,576 A | * | 12/1992 | Milton ......................... 70/185 |
| 5,205,790 A | * | 4/1993 | Barnabe et al. ............... 464/162 |
| 5,590,565 A | * | 1/1997 | Palfenier et al. .............. 74/493 |
| 5,937,500 A | * | 8/1999 | Bobbitt, III .................. 29/516 |
| 6,450,531 B1 | * | 9/2002 | Rinker et al. ................. 280/775 |
| 6,810,700 B2 | * | 11/2004 | Okuno ......................... 70/186 |
| 6,810,763 B1 | * | 11/2004 | Frick et al. ................... 74/492 |
| 7,010,996 B2 | * | 3/2006 | Schick et al. ................. 74/492 |
| 7,107,801 B2 | * | 9/2006 | Chartrain et al. ............. 70/185 |
| 7,174,803 B2 | * | 2/2007 | Reiche et al. ................. 74/493 |
| 7,234,328 B2 | * | 6/2007 | Okuno et al. ................. 70/186 |
| 2004/0020249 A1 | * | 2/2004 | Battermann et al. .......... 70/186 |
| 2004/0069025 A1 | * | 4/2004 | Dubay et al. ................. 70/186 |
| 2006/0021398 A1 | * | 2/2006 | Hasegawa et al. ............ 70/186 |
| 2006/0272370 A1 | * | 12/2006 | Yamada et al. ............... 70/186 |

* cited by examiner

*Primary Examiner*—Suzanne D Barrett
(74) *Attorney, Agent, or Firm*—Thomas N. Twomey (57) ABSTRACT

A steering column assembly includes a steering shaft rotatable about a longitudinal axis with a plurality of first plates fixedly mounted to the steering shaft. The first plates are spaced from each other to define a gap therebetween. A plurality of second plates are disposed about the steering shaft with at least one of the second plates disposed in each of the gaps. The plates abut each other for providing a frictional engagement therebetween to cause concurrent rotation of the steering shaft and the plates when a locking member is in an unlocked position. The locking member engages the second plates when in a locked position for preventing rotation of the second plates with the steering shaft and the first plates continuing to be impeded from rotating until the frictional engagement is overcome thereby allowing relative rotation of the steering shaft and the first plates relative to the second plates.

20 Claims, 7 Drawing Sheets

STEERING COLUMN ASSEMBLY

BACKGROUND OF THE INVENTION

1. Field of the Invention

The present invention relates to a steering column assembly for a vehicle.

2. Description of the Prior Art

Typically, vehicles are equipped with steering column assemblies for preventing rotation of a steering shaft about a longitudinal axis when an ignition is turned off. The assembly includes a plurality of first plates fixedly mounted to the steering shaft for concurrent rotation of the first plates and the steering shaft about the longitudinal axis. A locking member is movable between a locked position for preventing rotation of the steering shaft about the longitudinal axis and an unlocked position for permitting free rotation of the steering shaft about the longitudinal axis. The locking member engages the first plates when in the locked position which prevents rotation of the steering shaft until the locking member disengages from the first plates when in the unlocked position. If a user applies a predetermined torque to the steering shaft while the locking member engages the first plates, the steering shaft may be damaged due to the inability of the steering shaft to rotate or slip relative to the first plates.

Therefore there remains a need to develop a steering column assembly for allowing a steering shaft to rotate relative to a plurality of second plates when a locking member is in a locked position.

SUMMARY OF THE INVENTION AND ADVANTAGES

The present invention provides for a steering column assembly including a steering shaft defining a longitudinal axis with the steering shaft rotatable about the longitudinal axis. A plurality of first plates are fixedly mounted to the steering shaft for concurrent rotation of the first plates and the steering shaft about the longitudinal axis with the first plates spaced from each other to define a gap between the first plates. A locking member is movable between a locked position for impeding rotation of the steering shaft about the longitudinal axis and an unlocked position for permitting free rotation of the steering shaft about the longitudinal axis. A plurality of second plates are disposed about the steering shaft and rotatable about the longitudinal axis relative to the steering shaft with at least one of the second plates disposed in each of the gaps. The first and second plates abut each other for providing a frictional engagement therebetween to cause concurrent rotation of the steering shaft and the first and second plates when the locking member is in the unlocked position. The locking member engages the second plates when in the locked position for preventing rotation of the second plates with the steering shaft and the first plates continuing to be impeded from rotating relative to the second plates until the frictional engagement is overcome thereby allowing relative rotation of the steering shaft and the first plates relative to the second plates.

The present invention therefore provides for a steering column assembly having a plurality of first plates and a plurality of second plates disposed about a steering shaft such that the first and second plates abut each other for providing a frictional engagement. A locking member engages the second plates when in a locked position for preventing rotation of the second plates with the steering shaft and the first plates continuing to be impeded from rotating relative to the second plates until the frictional engagement is overcome thereby allowing relative rotation of the steering shaft and the first plates relative to the second plates for preventing damage to the steering shaft.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
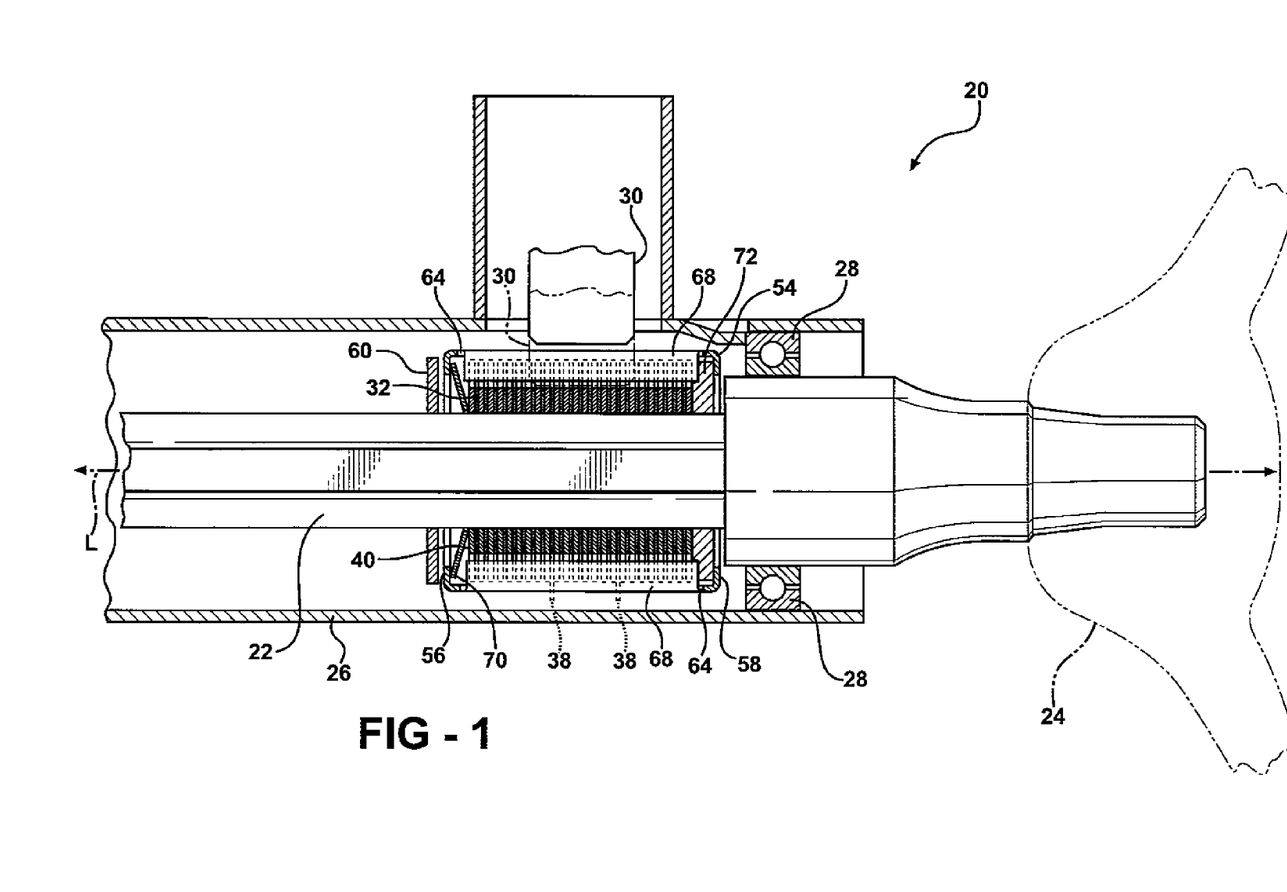
FIG. 1 is a partial cross-sectional view of a steering column assembly having a locking member in a locked position as shown in phantom lines and the locking member in an unlocked position as shown in solid lines with a housing and a plurality of first plates and a plurality of second plates disposed about a steering shaft of a first embodiment.

Referring to the Figures, wherein like numerals indicate like or corresponding parts throughout the several views, a steering column assembly 20 for a vehicle (not shown) is generally shown in FIG. 1.

The steering column assembly 20 includes a steering shaft 22 defining a longitudinal axis L with the steering shaft 22 rotatable about the longitudinal axis L. A steering wheel 24 is coupled to an end of the steering shaft 22 and rotatable about the longitudinal axis L for allowing a user to steer the vehicle. A column jacket 26 is disposed about the steering shaft 22 for supporting the steering shaft 22 such that the steering shaft 22 is rotatable within the column jacket 26. A plurality of bearings 28 are disposed between the column jacket 26 and the steering shaft 22 for preventing wear between the column jacket 26 and the steering shaft 22.

The steering column assembly 20 further includes a locking member 30 movable between a locked position for impeding rotation of the steering shaft 22 about the longitudinal axis L and an unlocked position for permitting free rotation of the steering shaft 22 about the longitudinal axis L. As shown in FIG. 1, the locking member 30 is in the locked position as shown in phantom and the locking member 30 is in the unlocked position as shown in solid lines. An ignition (not shown) is coupled to the column jacket 26 for turning the vehicle on and off. The ignition selectively actuates the locking member 30 to move between the locked and unlocked positions. The locking member 30 may be actuated by a solenoid, manually or any other suitable method for moving the locking member 30 between the locked and unlocked positions.

When the ignition is on, the locking member 30 is in the unlocked position for permitting free rotation of the steering shaft 22 about the longitudinal axis L which also allows free rotation of the steering wheel 24. When the ignition is turned off, the locking member 30 is in the locked position for impeding rotation of the steering shaft 22 about the longitudinal axis L which also impedes rotation of the steering wheel 24 until a predetermined torque is applied to the steering wheel 24. When the predetermined torque is applied while the locking member 30 is in the locked position, the steering wheel 24 and the steering shaft 22 rotate for preventing damage to the steering shaft 22. In other words, the steering shaft 22 slips when the predetermined torque is applied while the locking member 30 is in the locked position. When less than the predetermined torque is applied while the locking member 30 is in the locked position, the steering wheel 24 and the steering shaft 22 are impeded from rotating. In other words, the steering shaft 22 and the steering wheel 24 will not rotate when less than the predetermined torque is applied while the locking member 30 is in the locked position.

Figure 2:
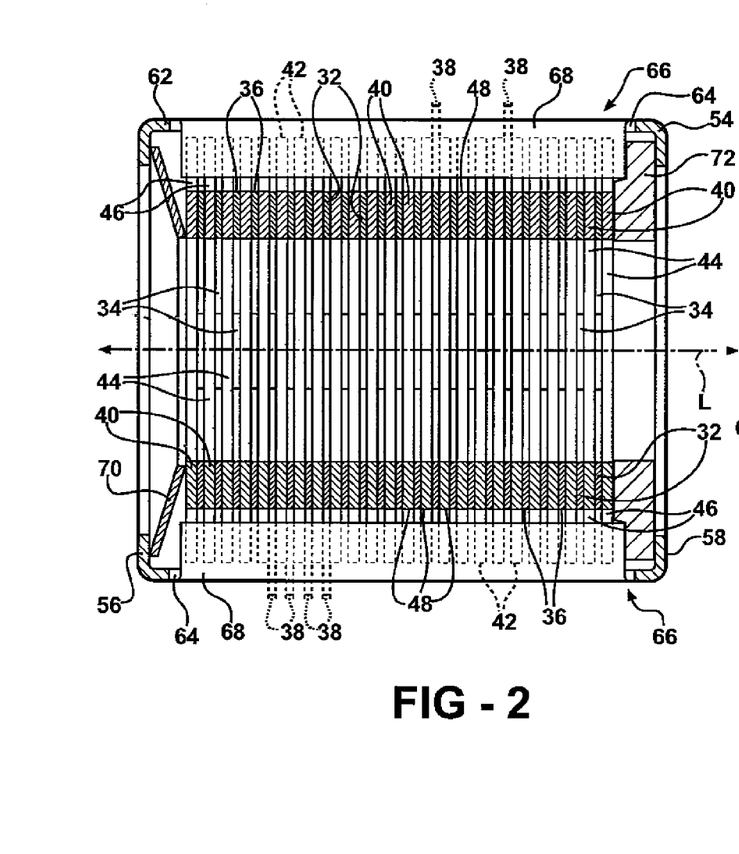
FIG. 2 is a cross-sectional view of the housing with the first and second plates abutting each other in an alternating configuration of the first embodiment.
Figure 3:
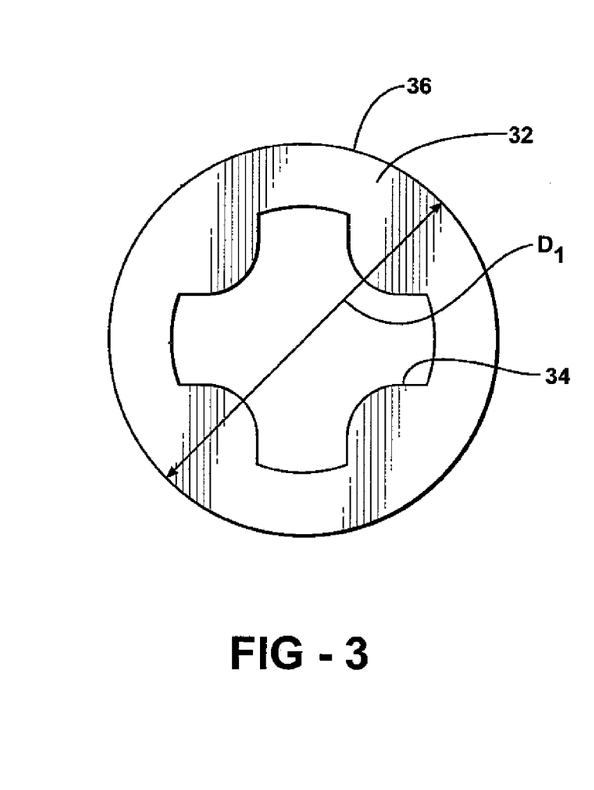
FIG. 3 is a front view of one of the first plates.

Also referring to FIGS. 2 and 3, a plurality of first plates 32 are fixedly mounted to the steering shaft 22 for concurrent rotation of the first plates 32 and the steering shaft 22 about the longitudinal axis L. More specifically, each of the first plates 32 define an aperture 34 along the longitudinal axis L which is complementary in configuration to the steering shaft 22. In other words, the first plates 32 are keyed to the steering shaft 22 such that the first plates 32 and the steering shaft 22 concurrently rotate about the longitudinal axis L.

Each of the first plates 32 include an outer periphery 36 defining an outer diameter $D_1$ with the outer periphery 36 of each of the first plates 32 spaced a predetermined distance radially from the longitudinal axis L. The first plates 32 are spaced from each other to define a gap 38 between the first plates 32. The gap 38 may be disposed between all of the first plates 32 or less than all of the first plates 32. When having the gap 38 disposed between less than all of the first plates 32, a select number of the first plates 32 abut each other.

A plurality of second plates 40 are disposed about the steering shaft 22 and rotatable about the longitudinal axis L relative to the steering shaft 22. At least one of the second plates 40 is disposed in each of the gaps 38 of the first plates 32. Typically, the first and second plates 32, 40 abut each other in an alternating configuration such that one of the second plates 40 is disposed in one of the gaps 38 between each of the first plates 32. However, it is to be appreciated that two or more of the second plates 40 may be disposed in each of the gaps 38. It is to be further appreciated that the number of the second plates 40 disposed in each of the gaps 38 may vary, such as for example, one of the second plates 40 may be disposed in one of the gaps 38 and two or more of the second plates 40 disposed in an other one of the gaps 38, etc.

The first and second plates 32, 40 abut each other for providing a frictional engagement therebetween to cause concurrent rotation of the steering shaft 22 and the first and second plates 32, 40 when the locking member 30 is in the unlocked position. The locking member 30 engages the second plates 40 when in the locked position for preventing rotation of the second plates 40 with the steering shaft 22 and the first plates 32 continuing to be impeded from rotating relative to the second plates 40 until the frictional engagement is overcome thereby allowing relative rotation of the steering shaft 22 and the first plates 32 relative to the second plates 40. In other words, when the predetermined torque is achieved when the locking member 30 is in the locked position, the steering shaft 22 and the first plates 32 rotate relative to the second plates 40. Impeding means that when less than the predetermined torque is applied while the locking member 30 is in the locked position, the frictional engagement between the first and second plates 32, 40 is not overcome and the steering shaft 22 and the first plates 32 will not rotate relative to the second plates 40; and, when the predetermined torque is achieved while the locking member 30 is in the locked position, the frictional engagement between the first and second plates 32, 40 is overcome which allows the steering shaft 22 and the first plates 32 to rotate relative to the second plates 40. It is to be appreciated that the first and second plates 32, 40 continue to remain in frictional engagement during rotation of the steering shaft 22 and the first plates 32 relative to the second plates 40. In other words, the first and second plates 32, 40 remain abutting each other during rotation.

The first and second plates 32, 40 are formed of a metal material, more specifically, a steel. It is to be appreciated that the first and second plates 32, 40 may be formed of any suitable material known to those of ordinary skill in the art to allow the frictional engagement therebetween. It is to be further appreciated that a substance or a coating may be applied to the first plates 32 and/or the second plates 40 to increase the frictional engagement therebetween.

Figure 4:
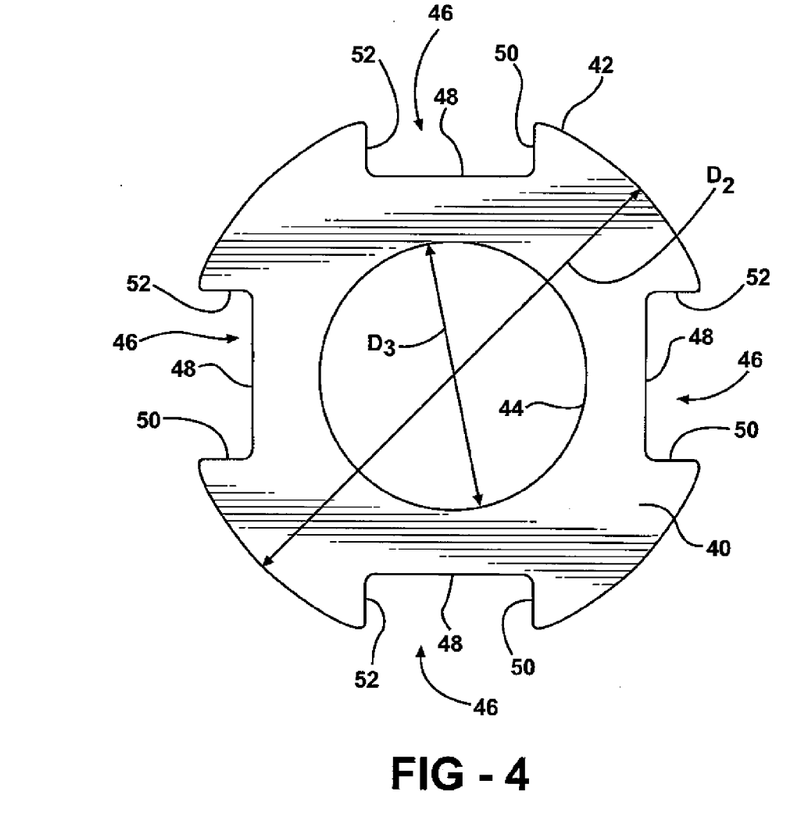
FIG. 4 is a front view of one of the second plates defining a plurality of notches of the first embodiment.
Figure 5:
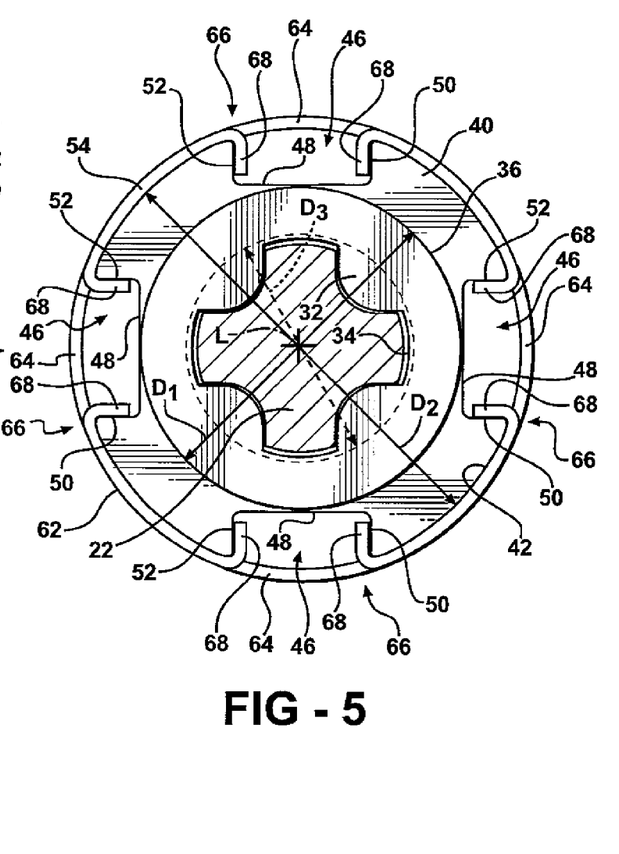
FIG. 5 is an end view of a plurality of tabs extending from the housing and into the notches of the first embodiment with a washer and a second end of the housing removed.

Referring to FIGS. 4 and 5, each of the second plates 40 include an outer perimeter 42 defining an outer diameter $D_2$ greater than the outer diameter $D_1$ of the first plates 32 for preventing engagement of the locking member 30 with the first plates 32. Each of the second plates 40 define an hole 44 along the longitudinal axis L for receiving the steering shaft 22. The hole 44 of each of the second plates 40 define an inner diameter $D_3$ less than the outer diameter $D_1$ of the first plates 32 and less than the outer diameter $D_2$ of the second plates 40 such that the hole 44 of each of the second plates 40 is configured to allow the steering shaft 22 to rotate independently of the second plates 40.

The outer perimeter 42 of each of the second plates 40 define at least one notch 46 for receiving the locking member 30. More specifically, the at least one notch 46 is further defined as a plurality of notches 46 spaced substantially equally from each other for receiving the locking member 30. In other words, the locking member 30 engages one of the notches 46 of the second plates 40. It is to be appreciated that the notches 46 may be spaced away from each other at any suitable spacing. Each of the notches 46 of each of the second plates 40 extend toward the longitudinal axis L to a base surface 48. The base surface 48 is spaced a predetermined distance radially from the longitudinal axis L such that the predetermined distance of the outer periphery 36 of each of the first plates 32 is less than the predetermined distance of the base surface 48 of each of the second plates 40 for spacing the locking member 30 away from the outer periphery 36 of the first plates 32 when in the locked position such that the first plates 32 may rotate without engaging the locking member 30. Each of the notches 46 of each of the second plates 40 extend radially relative to the longitudinal axis L to a first side 50 and a second side 52 spaced from each other. The first and second sides 50, 52 extend between the outer perimeter 42 and the base surface 48.

Referring back to FIGS. 1 and 2, a housing 54 is disposed about the steering shaft 22 with the first and second plates 32, 40 disposed in the housing 54. The housing 54 includes a first end 56 and a second end 58 spaced from each other along the longitudinal axis L with the first and second plates 32, 40 disposed between the first and second ends 56, 58. At least one stop member 60 may be coupled to the steering shaft 22 adjacent at least one of the first and second ends 56, 58 of the housing 54 for preventing movement of the housing 54 along the longitudinal axis L. Typically, the stop member 60 is disposed adjacent the first end 56 of the housing 54. The stop member 60 may be further defined as a snap ring or any other suitable stop member for preventing movement of the housing 54 along the longitudinal axis L. It is to be appreciated that the stop member 60 may be further defined as a plurality of stop members 60 with one of the stop members 60 disposed adjacent the first end 56 and an other one of the stop members 60 disposed adjacent the second end 58. It is to be further appreciated that the stop member 60 is optional.

The housing 54 includes a body portion 62 defining at least one slot 64 disposed between the first and second ends 56, 58 for receiving the locking member 30. More specifically, the at least one slot 64 is further defined as a plurality of slots 64 disposed between the first and second ends 56, 58 and spaced substantially equally from each other for receiving the locking member 30. It is to be appreciated that the slots 64 may be spaced away from each other at any suitable spacing. The slots 64 of the housing 54 align with the notches 46 of the second plates 40 for allowing the locking member 30 to extend through one of the slots 64 of the housing 54 and into one of the notches 46 of the second plates 40 when in the locked position.

At least one of the housing 54 and the second plates 40 further include an interconnection portion 66 for coupling each of the second plates 40 to each other such that the second plates 40 rotate together. More specifically, the second plates 40 will rotate together when the locking member 30 is in the unlocked position and the second plates 40 will be stationary together when the locking member 30 is in the locked position. In this embodiment, the housing 54 includes the interconnection portion 66.

Also referring to FIG. 5, the interconnection portion 66 includes a plurality of tabs 68 extending from the body portion 62 adjacent the slots 64 with the tabs 68 extending inwardly toward the first plates 32 and abutting the second plates 40. More specifically, a pair of the tabs 68 are disposed in each of the notches 46 of each of the second plates 40 for coupling each of the second plates 40 to each other and for securing the second plates 40 to the body portion 62 of the housing 54. Further, the tabs 68 align the notches 46 of each of the second plates 40 with each other and align the slots 64 of the body portion 62 with the notches 46 of the second plates 40. The pair of tabs 68 are spaced from each other in each of the notches 46 such that one of the pair of tabs 68 abuts the first side 50 of one of the notches 46 and an other one of the pair of tabs 68 abuts the second side 52 of the same one of the notches 46. The tabs 68 extend a predetermined length along the longitudinal axis L for abutting the first and second sides 50, 52 of each of the second plates 40. When the locking member 30 is in the locked position, the locking member 30 may engage the tabs 68 within the notches 46. When assembling the first and second plates 32, 40 within the housing 54, the notches 46 of the second plates 40 align with the slots 64 of the body portion 62 and the tabs 68 are deformed or bent inwardly toward the longitudinal axis L with one of the tabs 68 abutting the first side 50 and an other one of the tabs 68 abutting the second side 52 within each of the notches 46.

A biasing member 70 abuts the first end 56 and one of the first and second plates 32, 40 for biasing the first and second plates 32, 40 into the frictional engagement with each other. More specifically, the biasing member 70 is disposed within the housing 54 and about the steering shaft 22. The biasing member 70 may be further defined as a spring or any other suitable biasing member for biasing the first and second plates 32, 40 into frictional engagement with each other. A washer 72 abuts the second end 58 and one of the first and second plates 32, 40 for spacing the first and second plates 32, 40 away from the second end 58. It is to be appreciated that the biasing member 70 and the washer 72 may be reversed such that the washer 72 abuts the first end 56 and the biasing member 70 abuts the second end 58. When assembling the first and second plates 32, 40 within the housing 54, a force is applied to the washer 72 for compressing the biasing member 70 to a desired load or a spring force. In other words, the washer 72 presses the first and second plates 32, 40 together toward the biasing member 70 and the biasing member 70 is compressed between the first end 56 and one of the first and second plates 32, 40 until the desired load is achieved, thereby causing the frictional engagement between the first and second plates 32, 40. When the desired load is achieved, the second end 58 of the housing 54 is deformed or bent to abut the washer 72 to maintain the desired load. Thus, the first and second plates 32, 40, the biasing member 70 and the washer 72 are pre-assembled in the housing 54 before disposing the housing 54 about the steering shaft 22, which reduces costs. In other words, the housing 54 is a self-contained unit and is easily disposed about the steering shaft 22 which reduces assembly time.

For illustrative purposes only, the operation of the locking member 30 moving from the unlocked position to the locked position will be discussed below to illustrate the steering shaft 22 rotating or slipping relative to the housing 54 and the second plates 40 for preventing damage to the steering shaft 22.

When the ignition of the vehicle is on, the locking member 30 is in the unlocked position. The locking member 30 is spaced from the second plates 40 and the housing 54 which permits the user to freely rotate the steering wheel 24. In other words, the first and second plates 32, 40, the housing 54, the biasing member 70, the washer 72 and the steering shaft 22 concurrently rotate when the user rotates the steering wheel 24 due to the frictional engagement between the first and second plates 32, 40, the biasing member 70, the washer 72, and the first and second ends 56, 58 of the housing 54.

When the ignition of the vehicle is off, the locking member 30 is in the locked position with the locking member 30 extending through one of the slots 64 of the housing 54 and into one of the notches 46 of the second plates 40. It is to be appreciated that the locking member 30 may engage the housing 54 for preventing rotation of the housing 54 and the second plates 40. The steering shaft 22 and the first plates 32 are impeded from rotating when the locking member 30 is in the locked position due to the frictional engagement between the first and second plates 32, 40, thus the user is unable to rotate the steering wheel 24. In other words, if the user attempts to rotate the steering wheel 24 while the locking member 30 is in the locked position and less than the predetermined torque is applied, the steering shaft 22, the housing 54, the first and second plates 32, 40, the washer 72 and the biasing member 70 will remain stationary. When the frictional engagement between the first and second plates 32, 40 are overcome while the locking member 30 is in the locked position, the first plates 32 and the steering shaft 22 will rotate or slip relative to the second plates 40 and the housing 54 for preventing damage to the steering shaft 22. In other words, if the user attempts to rotate the steering wheel 24 while the locking member 30 is in the locked position and the predetermined torque is achieved, the steering shaft 22 and the first plates 32 will rotate relative to the second plates 40 for preventing damage to the steering shaft 22. It is to be appreciated that the biasing member 70 and/or the washer 72 may rotate or remain stationary when the frictional engagement is overcome between the first and second plates 32, 40.

Figure 6:
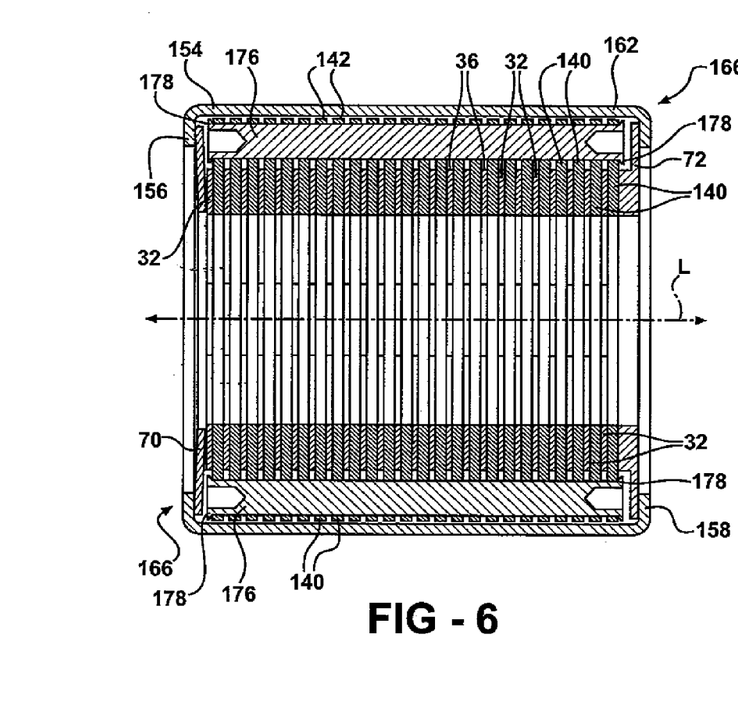
FIG. 6 is a cross-sectional view of a housing and a plurality of first plates and a plurality of second plates abutting each other in an alternating configuration with a plurality of pins disposed through each of the second plates for coupling the second plates to each other of a second embodiment.
Figure 7:
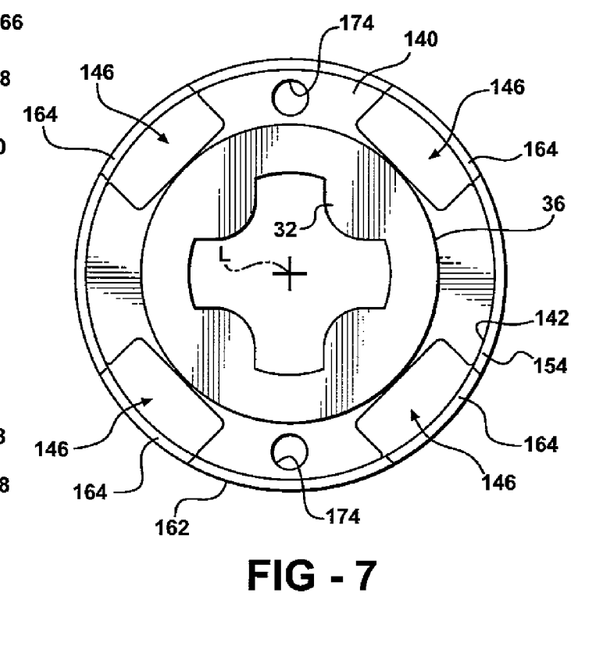
FIG. 7 is an end view of the housing with the second plates defining a plurality of notches and a plurality of orifices spaced from the notches of the second embodiment with the pins, a washer and a second end of the housing removed.

Referring to FIGS. 6 and 7, a second embodiment of a housing 154 and a plurality of second plates 140 including an interconnection portion 166 for coupling each of the second plates 140 to each other such that the second plates 140 rotate together is shown. Identical or similar components discussed in the first embodiment have the same reference numerals in this embodiment and additional or different components of this embodiment have different reference numerals. In this embodiment, the tabs 68 of the first embodiment are eliminated. The operation of the locking member 30 moving from the unlocked position to the locked position to illustrate the steering shaft 22 rotating or slipping relative to the housing 154 and the second plates 140 for preventing damage to the steering shaft 22 is the same in this embodiment as discussed in the first embodiment and will not be discussed further.

Each of the second plates 140 include an outer perimeter 142 defining a plurality of notches 146 spaced from each other. The interconnection portion 166 defines at least one orifice 174 disposed through each of the second plates 140 and spaced from the notches 146 between the outer perimeter 142 of the second plates 140 and the outer periphery 36 of the first plates 32. The at least one orifice 174 is further defined as a plurality of orifices 174 spaced substantially equally away from each other. It is to be appreciated that the orifices 174 may be spaced away from each other at any suitable spacing.

The interconnection portion 166 includes at least one pin 176 disposed through the orifice 174 of each of the second plates 140 for coupling each of the second plates 140 to each other and for aligning the notches 146 of each of the second plates 140 with each other. The at least one pin 176 is further defined as a plurality of pins 176 with one of the pins 176 disposed through one of the orifices 174 and an other one of the pins 176 disposed through an other one of the orifices 174. Each of the pins 176 include a plurality of ends 178 spaced from each other. The ends 178 flare outwardly for securing the pins 176 to the second plates 140.

The housing 154 includes a body portion 162 defining at least one slot 164 disposed between a first end 156 and a second end 158 for receiving the locking member 30. More specifically, the at least one slot 164 is further defined as a plurality of slots 164 disposed between the first and second ends 156, 158 and spaced substantially equally from each other for receiving the locking member 30. It is to be appreciated that the slots 164 may be spaced away from each other at any suitable spacing. The notches 146 of each of the second plates 140 align with the slots 164 of the body portion 162 of the housing 154.

As discussed in the first embodiment, when assembling the first and second plates 32, 140 within the housing 154, the force is applied to the washer 72 for compressing the biasing member 70 to the desired load or the spring force. In other words, the washer 72 presses the first and second plates 32, 140 together toward the biasing member 70 and the biasing member 70 is compressed between the first end 156 and one of the first and second plates 32, 140 until the desired load is achieved, thereby causing the frictional engagement between the first and second plates 32, 140. The frictional engagement between the first and second plates 32, 140, the biasing member 70, the washer 72, and the first and second ends 156, 158 of the housing 154 allows the notches 146 and the slots 164 to remain in alignment with each other.

Figure 8:
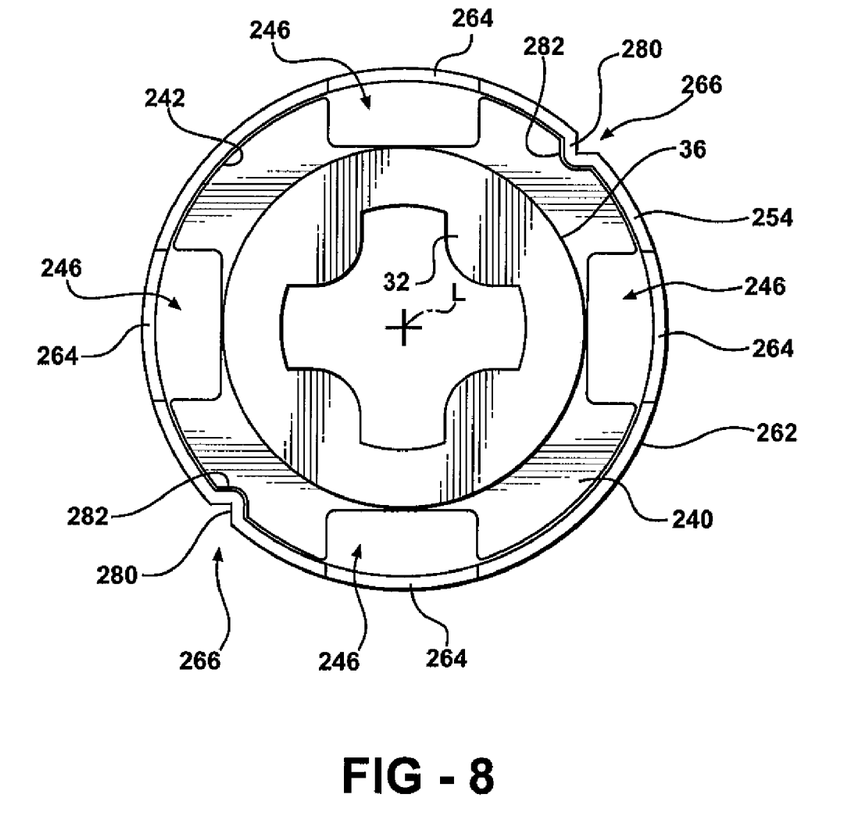
FIG. 8 is an end view of a housing having a plurality of projections and a plurality of second plates defining a plurality of depressions with the projections abutting the depressions of a third embodiment with a washer and a second end of the housing removed.

Referring to FIG. 8, a third embodiment of a housing 254 and a plurality of second plates 240 including an interconnection portion 266 for coupling each of the second plates 240 to each other such that the second plates 240 rotate together is shown. Identical or similar components discussed in the first and second embodiments have the same reference numerals in this embodiment and additional or different components of this embodiment have different reference numerals. In this embodiment, the tabs 68 of the first embodiment are eliminated and the pins 176 and the orifices 174 of the second embodiment are eliminated. The operation of the locking member 30 moving from the unlocked position to the locked position to illustrate the steering shaft 22 rotating or slipping relative to the housing 254 and the second plates 240 for preventing damage to the steering shaft 22 is the same in this embodiment as discussed in the first embodiment and will not be discussed further.

The housing 254 includes a body portion 262 defining at least one slot 264 disposed between a first end (not shown) and a second end (not shown) for receiving the locking member 30. More specifically, the at least one slot 264 is further defined as a plurality of slots 264 disposed between the first and second ends and spaced substantially equally from each other for receiving the locking member 30. It is to be appreciated that the slots 264 may be spaced away from each other at any suitable spacing.

The interconnection portion 266 includes at least one projection 280 extending inwardly from the body portion 262 toward the longitudinal axis L between the first and second ends and spaced from the slots 264. The at least one projection 280 is further defined as a plurality of projections 280 spaced substantially equally away from each other. It is to be appreciated that the projections 280 may be spaced away from each other at any suitable spacing.

Each of the second plates 240 include an outer perimeter 242 defining a plurality of notches 246 spaced from each other with the notches 246 of each of the second plates 240 aligning with the slots 264 of the body portion 262 of the housing 254. The interconnection portion 266 defines at least one depression 282 disposed in each of the second plates 240 and spaced from the notches 246 with the depression 282 abutting the projection 280. The at least one depression 282 is further defined as a plurality of depressions 282 with one of the projections 280 abutting one of the depressions 282 of each of the second plates 240 and an other one of the projections 280 abutting an other one of the depressions 282 of each of the second plates 240 for coupling each of the second plates 240 to each other and for securing the second plates 240 to the body portion 262 of the housing 254. Further, the projections 280 and the depressions 282 align the notches 246 of each of the second plates 240 with each other and align the slots 264 of the body portion 262 with the notches 246 of the second plates 240. The depressions 282 are spaced substantially equally away from each other. It is to be appreciated that the depressions 282 may be spaced away from each other at any suitable spacing. The projections 280 extend a predetermined length along the longitudinal axis L for abutting each of the depressions 282 of each of the second plates 240.

Referring to FIGS. 9-12, a fourth embodiment of a plurality of second plates 340 including an interconnection portion 366 for coupling each of the second plates 340 to each other such that the second plates 340 rotate together is shown. Identical or similar components discussed in the first, second and third embodiments have the same reference numerals in this embodiment and additional or different components of this embodiment have different reference numerals. In this embodiment, the tabs 68 of the first embodiment are eliminated and the pins 176 and the orifices 174 of the second embodiment are eliminated. In addition, the projections 280 and depressions 282 of the third embodiment are eliminated. Further, the configuration of the housing 154 as discussed in the second embodiment is the same for this embodiment. The operation of the locking member 30 moving from the unlocked position to the locked position to illustrate the steering shaft 22 rotating or slipping relative to the housing 154 and the second plates 340 for preventing damage to the steering shaft 22 is the same in this embodiment as discussed in the first embodiment and will not be discussed further.

Each of the second plates 340 include an outer perimeter 342 defining a plurality of notches 346 spaced from each other. The interconnection portion 366 includes a plurality of fingers 384 extending from each of the second plates 340 along the longitudinal axis L with the fingers 384 spaced from the notches 346 and spaced substantially equally away from each other. It is to be appreciated that the fingers 384 may be spaced away from each other at any suitable spacing.

The interconnection portion 366 defines a plurality of recesses 386 disposed through each of the second plates 340 and spaced from the notches 346 and the fingers 384. The recesses 386 are spaced substantially equally away from each other such that the fingers 384 of one of the second plates 340 is disposed in the recesses 386 of an other one of the second plates 340. In other words, when coupling the second plates 340 to each other, the second plates 340 are rotated 90 degrees (90°) relative to each other such that the fingers 384 of one of the second plates 340 is disposed in the recesses 386 of an other one of the second plates 340 for coupling each of the second plates 340 to each other and for aligning the notches 346 of each of the second plates 340 with each other. It is to be appreciated that the recesses 386 may be spaced away from each other at any suitable spacing.

Figure 9:
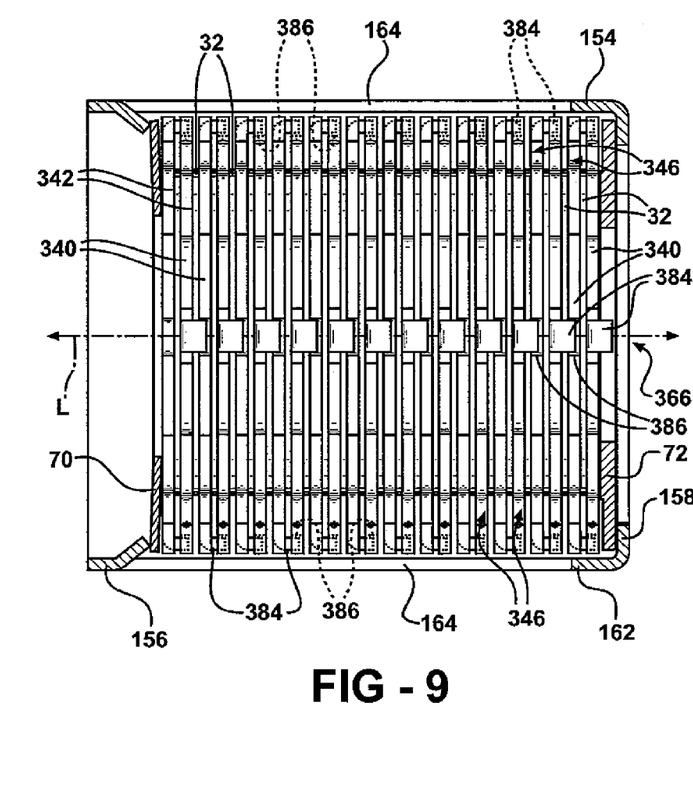
FIG. 9 is a cross-sectional view of a housing showing a plurality of first plates and a plurality of second plates of a fourth embodiment within the housing with the first and second plates abutting each other in an alternating configuration and a plurality of fingers extending from each of the second plates.
Figure 10:
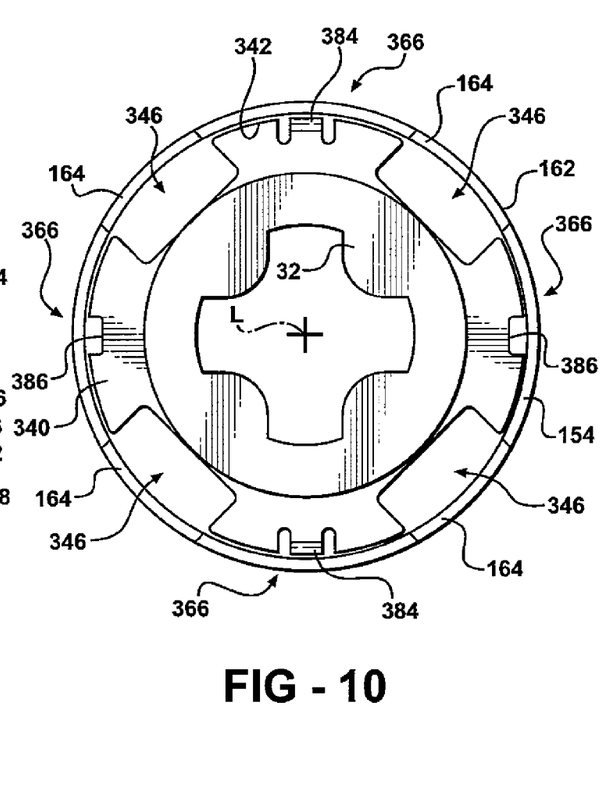
FIG. 10 is an end view of the housing with the second plates defining a plurality of notches and a plurality of recesses spaced from the notches and the fingers of the fourth embodiment with a washer and a second end of the housing removed.
Figure 11:
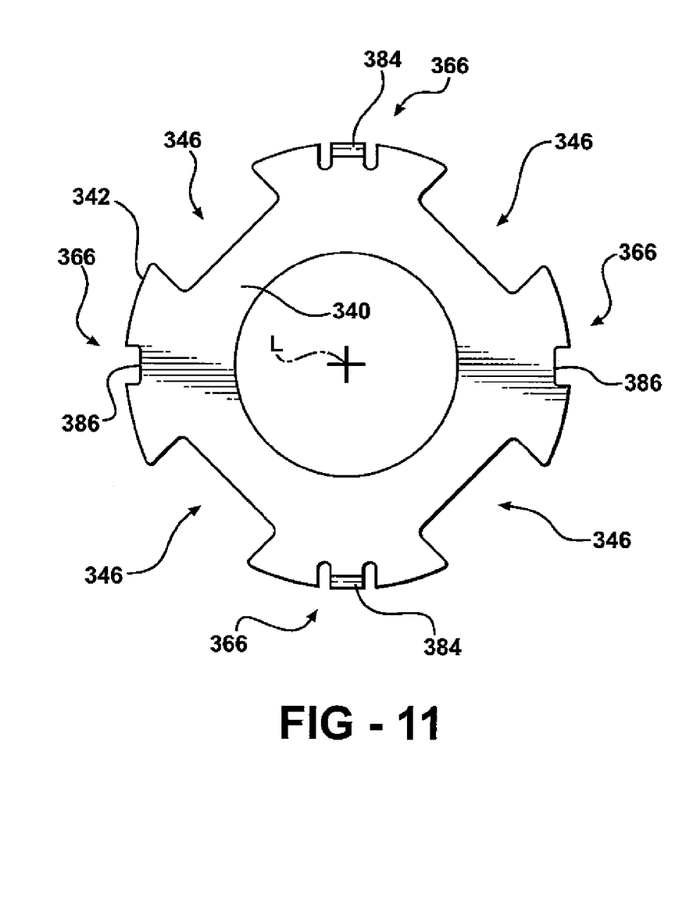
FIG. 11 is a front view of one of the second plates of the fourth embodiment.
Figure 12:
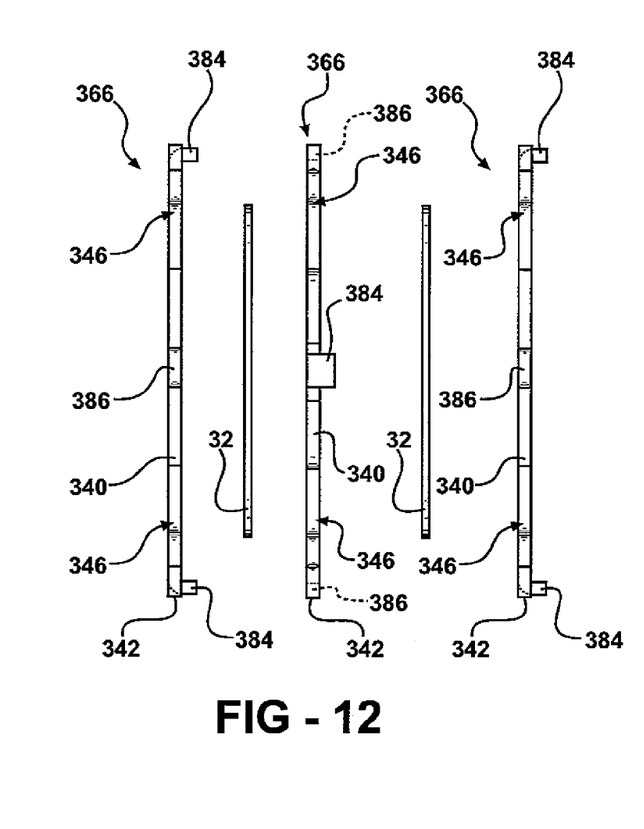
FIG. 12 is an exploded view of a portion of the first and second plates of the fourth embodiment.

As discussed in the first embodiment, when assembling the first and second plates 32, 340 within the housing 154, the force is applied to the washer 72 for compressing the biasing member 70 to the desired load or the spring force. In other words, the washer 72 presses the first and second plates 32, 340 together toward the biasing member 70 and the biasing member 70 is compressed between the first end 156 and one of the first and second plates 32, 340 until the desired load is achieved, thereby causing the frictional engagement between the first and second plates 32, 340. The notches 346 of each of the second plates 340 align with the slots 164 of the body portion 162 of the housing 154. The frictional engagement between the first and second plates 32, 340, the biasing member 70, the washer 72, and the first and second ends 156, 158 of the housing 154 allows the notches 346 and the slots 164 to remain in alignment with each other. Referring to FIG. 9, the housing 154, the washer 72, and the biasing member 70 are shown in a cross-sectional view to show the first and second plates 32, 340 abutting each other with the second plates 340 coupled to each other within the housing 154. In other words, the first and second plates 32, 340 are not in a cross-sectional view in FIG. 9 to show the first and second plates 32, 340 abutting each other with the second plates 340 coupled to each other within the housing 154.

Obviously, many modifications and variations of the present invention are possible in light of the above teachings. The foregoing invention has been described in accordance with the relevant legal standards; thus, the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A steering column assembly for a vehicle, said assembly comprising:
   a steering shaft defining a longitudinal axis and rotatable about said longitudinal axis;
   a plurality of first plates fixedly mounted to said steering shaft for concurrent rotation of said first plates and said steering shaft about said longitudinal axis with said first plates spaced from each other to define a gap between said first plates;
   a locking member movable between a locked position for impeding rotation of said steering shaft about said longitudinal axis and an unlocked position for permitting free rotation of said steering shaft about said longitudinal axis; and
   a plurality of second plates disposed about said steering shaft and rotatable about said longitudinal axis relative to said steering shaft with at least one of said second plates disposed in each of said gaps and said first and second plates abutting each other for providing a frictional engagement therebetween to cause concurrent rotation of said steering shaft and said plates when said locking member is in said unlocked position and said locking member engaging said second plates when in said locked position for preventing rotation of said second plates with said steering shaft and said first plates continuing to be impeded from rotating relative to said second plates until said frictional engagement is overcome thereby allowing relative rotation of said steering shaft and said first plates relative to said second plates.

2. An assembly as set forth in claim 1 wherein each of said first plates include an outer periphery defining an outer diameter and wherein each of said second plates include an outer perimeter defining an outer diameter greater than said outer diameter of said first plates for preventing engagement of said locking member with said first plates.

3. An assembly as set forth in claim 2 wherein said outer perimeter of each of said second plates define at least one notch for receiving said locking member.

4. An assembly as set forth in claim 3 wherein said at least one notch is further defined as a plurality of notches spaced substantially equally from each other for receiving said locking member.

5. An assembly as set forth in claim 4 wherein each of said notches of each of said second plates extend toward said longitudinal axis to a base surface with said base surface spaced a predetermined distance radially from said longitudinal axis and said outer periphery of each of said first plates spaced a predetermined distance radially from said longitudinal axis less than said predetermined distance of said base surface of each of said second plates.

6. An assembly as set forth in claim 4 wherein said second plates include an interconnection portion for coupling each of said second plates to each other such that said second plates rotate together.

7. An assembly as set forth in claim 6 wherein said interconnection portion defines at least one orifice disposed through each of said second plates and spaced from said notches between said outer perimeter of said second plates and said outer periphery of said first plates.

8. An assembly as set forth in claim 7 wherein said interconnection portion includes at least one pin disposed through said orifice of each of said second plates.

9. An assembly as set forth in claim 6 wherein said interconnection portion includes a plurality of fingers extending from each of said second plates along said longitudinal axis with said fingers spaced from said notches and spaced substantially equally away from each other.

10. An assembly as set forth in claim 9 wherein said interconnection portion defines a plurality of recesses disposed through each of said second plates and spaced from said notches and said fingers with said recesses spaced substantially equally away from each other such that said fingers of one of said second plates is disposed in said recesses of an other one of said second plates.

11. An assembly as set forth in claim 1 further including a housing disposed about said steering shaft with said first and second plates disposed in said housing.

12. An assembly as set forth in claim 11 wherein said housing includes a first end and a second end spaced from each other along said longitudinal axis with said first and second plates disposed between said first and second ends.

13. An assembly as set forth in claim 12 wherein said housing includes a body portion defining a plurality of slots disposed between said first and second ends and spaced substantially equally from each other for receiving said locking member.

14. An assembly as set forth in claim 12 further including a biasing member abutting said first end and one of said first and second plates for biasing said first and second plates into said frictional engagement with each other.

15. An assembly as set forth in claim 12 further including a washer abutting said second end and one of said first and second plates for spacing said first and second plates away from said second end.

16. An assembly as set forth in claim 13 wherein at least one of said housing and said second plates further include an interconnection portion for coupling each of said second plates to each other such that said second plates rotate together.

17. An assembly as set forth in claim 16 wherein said interconnection portion includes a plurality of tabs extending from said body portion adjacent said slots with said tabs extending inwardly toward said first plates and abutting said second plates.

18. An assembly as set forth in claim 17 wherein each of said second plates include an outer perimeter defining a plurality of notches spaced from each other with a pair of said tabs disposed in each of said notches of each of said second plates.

19. An assembly as set forth in claim 16 wherein said interconnection portion includes at least one projection extending inwardly from said body portion toward said longitudinal axis between said first and second ends and spaced from said slots.

20. An assembly as set forth in claim 19 wherein each of said second plates include an outer perimeter defining a plurality of notches spaced from each other and wherein said interconnection portion defines at least one depression disposed in each of said second plates and spaced from said notches with said depression abutting said projection.

* * * * *